United States Patent
Laimins

[15] 3,707,270
[45] Dec. 26, 1972

[54] WEAR SLEEVE-TRANSDUCER COMBINATION FOR AIRCRAFT LANDING GEAR

[72] Inventor: Eric Laimins, Belmont, Mass.

[73] Assignee: BLH Electronics, Inc., Waltham, Mass.

[22] Filed: Nov. 30, 1970

[21] Appl. No.: 93,785

[52] U.S. Cl. ............................244/103 R, 73/88.5 R
[51] Int. Cl. .........................................B64c 25/00
[58] Field of Search ..........244/103 R, 102 R, 100 R; 73/88.5 R; 188/205, 206

[56] References Cited

UNITED STATES PATENTS

| | | | |
|---|---|---|---|
| 3,426,586 | 2/1969 | Kadlec | 73/88.5 R |
| 3,521,484 | 7/1970 | Dybvad et al | 73/88.5 R |
| 3,273,382 | 9/1966 | Fonash | 73/88.5 R |

Primary Examiner—Milton Buchler
Assistant Examiner—Paul E. Sauberer
Attorney—James E. Mrose and Mary C. Thomson

[57] ABSTRACT

A brake sleeve protecting an aircraft landing gear axle from brake collar wear is prevented from adversely affecting distributions of forces sensed by an inside-axle strain gage transducer by being split into a pair of end-to-end, substantially tubular sleeve parts fitted on the axle with certain clearance and having a semi-annular gap formed therebetween above the neutral axis of the axle, whereby pivotal movements of the sleeve parts relative to one other are accommodated about a transverse horizontal axis at or below the neutral axis and measurement-disturbing mechanical interferences between the sleeve and the axis are minimized.

11 Claims, 6 Drawing Figures

PATENTED DEC 26 1972

INVENTOR
ERIC LAIMINS

BY James E. Mrose
ATTORNEY

INVENTOR
ERIC LAIMINS

BY  *James E. Mrose*
ATTORNEY

WEAR SLEEVE-TRANSDUCER COMBINATION FOR AIRCRAFT LANDING GEAR

BACKGROUND OF THE INVENTION

The present invention relates to improvements in the precision strain-gage measurement of loadings such as those which are effective at the wheels of aircraft and on which calculations of total weight and center of gravity may be based, and, in one particular aspect, to a novel and improved wear sleeve and inside-axle transducer combination. A wear sleeve, introduced between a brake collar and an aircraft landing gear axle to prevent the relatively sensitive axle from being damaged and to maintain a desired spacing between the wheel bearing and the landing gear truck beam, is uniquely formed as a dynamic pivoting unit which is not subject to certain slippages or to frictional displacements on the axle such as have commonly been experienced by brake sleeves heretofore employed for these purposes, and, as a result, permits a shear-responsive transducer positioned within the axle to make an accurate and substantially hysteresis-free measurement related to the load-imposed axle deflection.

In a landing gear system typical of that for many of today's large aircraft, the loading is shared by an array of wheel-and-axle units. Multi-wheel landing gear units may include a so-called truck beam, which is disposed substantially horizontally in transverse relation to a supporting strut and in turn supports the axle for at least a pair of wheels. All of the axles in the array for a given aircraft are normally disposed substantially parallel to one another, in transverse relation to the longitudinal axis of the aircraft fuselage. Commonly, a brake collar is mounted on each landing gear axle, between each of the wheels thereon and the axle-supporting truck beam for the landing gear unit. Where these brake collars are used, they should be prevented from scoring or otherwise wearing against the precision-made hollow wheel axles, because the latter should not be exposed to even minute damage or forced to undergo unusual stress concentrations which would eventually promote actual structural failure. Some improvement has been realized through the known practice of placing a tubular "wear" sleeve between the brake collar and the wheel axle.

In systems for calculating total weight and/or center of gravity, the individual wheel reactions are sensed by transducers which respond to axle deflections, and the latter may to a significant extent be adversely affected by what occurs at certain axle interfaces. One highly practical and successful transducer for use in such systems is conveniently inserted into and locked in place within a hollow axle, where it characterizes shear-related effects along a discrete region. U.S. Pat. No. 3,426,586, issued Feb. 11, 1969, discloses such transducers. In installations such as those under consideration here, the surrounding axle is not perfectly stable in its characteristics, because of changing conditions existing at interfaces occasioned by unavoidable presence of wear sleeves, and the transducer responses may be correspondingly unstable and erroneous. Interfaces of particular importance are those involving surfaces of the axle-wear sleeve, the axle-truck beam joint, and the axle-wheel bearing. Because of the close proximity of these interfaces to the transducers, especially that involving surfaces of the brake or wear sleeve, the stress and deflection distributions for the critical region of the axle structure are indeterminate and can have serious untoward effects upon the transducer performance. Even though the wear sleeve may be shrink-fitted rather tightly in place, there nevertheless occurs some unavoidable displacement, or slippage, between the internal surfaces of the relatively stiff wear sleeves and the mating outer surfaces of the wheel axle, mainly as a consequence of axle deflections. This interface frictional action affects the distribution of forces in such a way that the combined axle and sleeve may at times act as an integral thickened axle, and, at other times, as a pair of concentric but separate axle members. Tests have demonstrated that the hysteresis effects of these interface actions can be quite considerable, being as high as 10 percent at the locus of the transducers and even greater at the point where the wear sleeve engages the truck beam. Thus, in an aircraft weighing system incorporating a wear-sleeve-encompassed wheel axle, the shear-responsive transducers will also develop outputs involving related hysteresis effects, and error.

In accordance with certain aspects of the recognitions and teachings of the present invention, however, shear-responsive transducers mounted within the wheel axles of aircraft landing gear may be enabled to respond with intended precision to loading forces which produce shear in composite axle and wear sleeve assemblies; specifically, their responses accurately characterize the true aircraft weight reactions, isolated from those error-inducing effects caused by variations occurring at wear-sleeve interfaces with the wheel axle, the truck beam and the wheel bearing. The required immunity is uniquely achieved by a dynamically-functioning composite wear sleeve having two parts which abut at points about which they are pivotally articulated to protect the wheel axle from damage by the brake collar wear and to substantially eliminate the frictional hysteresis heretofore introduced by conventional wear sleeves.

SUMMARY OF THE INVENTION

Accordingly, it is one of the objects of the present invention to provide a novel and improved arrangement for the precision on-board measurement of aircraft weight-related wheel reactions at axle sites where wear-sleeve protection is afforded.

Another object is to provide unique and improved cooperating wear-sleeve and inside-axle on-board strain gage transducers for both preventing damage to a transducer-supporting aircraft wheel axle and isolating the same for accurate measurements of loading forces in the weight-related vertical direction only.

A further object of this invention is to provide an improved wear sleeve which protects a transducer-equipped aircraft wheel axle from damaging actions by a brake collar without introducing frictional hysteresis effects.

Still further it is an object of this invention to provide an improved wear sleeve, for use at a site where an aircraft wheel axle is gaged to sense loading thereon, which is constructed to pivot freely and independently of the axle in response to axle deflections and, thereby, to preserve stable conditions which promote accurate measurements of loading.

By way of a summary account of practice of this invention in one of its aspects, the foregoing and other objects are attained by a two-part dynamically-operating wear sleeve fitted on an aircraft wheel axle between the axle and a surrounding brake collar, the composite sleeve comprising a pair of adjacent and end-contacting substantially tubular parts. A substantially semi-annular gap is provided between the abutting tubular parts, above the neutral axis of the axle, by cutting away an edge portion of either one or both of the two parts. Weight supported by each aircraft wheel is detected by a shear-characterizing strain gage transducer mounted inside the hollow axle within the region spanned by the composite sleeve, the transducer being of a form which produces outputs accurately related to the wheel reaction due to the craft weight alone, without including components of error resulting from side loadings. Because at least one of the two wear-sleeve parts is appropriately spaced from the axle over most of its length, and because the upper portions of the abutting ends of the parts are spaced by the aforesaid gap, the two parts may pivot relative to one another about a horizontal axis transverse to the neutral axis of the axle. On upward deflection of the axle by its associated wheel, the attendant pivoting of the two-part sleeve prevents axial slippage or shifting of the sleeve assembly along the wheel axle and avoids changing the deflection characteristics of the axle sensing section wherein the transducers are disposed. Thus, the transducers remain stably responsive only to vehicle loading in the vertical direction.

BRIEF DESCRIPTION OF THE DRAWINGS

Although the aspects and features of this invention which are believed to be novel are expressed in the appended claims, additional details as to preferred practices and embodiments, and as to the further advantages, objects and features thereof, will be more readily appreciated as the same becomes better understood from the following detailed description when considered in connection with the accompanying drawings in which like reference numerals are used to designate like or corresponding parts in the several views thereof and wherein:

DESCRIPTION OF AN ILLUSTRATED EMBODIMENT

Figure 1:
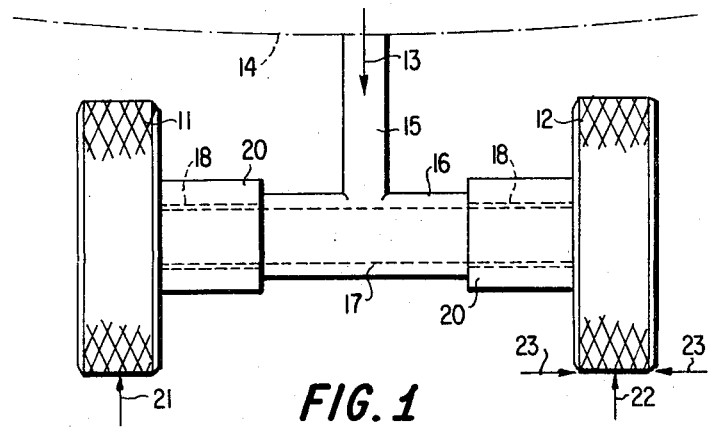
FIG. 1 illustrates a typical aircraft landing gear assembly for use with wear sleeves contructed in accordance with the teachings of the present invention.

The paired aircraft wheels 11 and 12 appearing in FIG. 1 represent part of a landing gear unit which bears some of the loading typically shared by a plurality of such units in a multi-strut landing gear array. A downward force 13 of the ground-supported aircraft, part of which is outlined at 14, is communicated to the wheels 11 and 12 by the usual tubular form of strut 15, truck beam 16 and axle 17, and thence to the underlying apron surfaces. The axle 17 and a pair of wear sleeves, or brake sleeves, 18 disposed at each end thereof between the axle and the conventional wheel-engaging brake collars 20 are shown in dotted lines in FIG. 1. Wheel reactions to the vertical loading imposed on a landing surface are characterized by force arrows 21 and 22, and normally are about equal for an assembly such as that which is illustrated. In addition to the downwardly-directed forces representing the aircraft weight, which are the specific forces of interest for measurement purposes, the wheel reactions can be expected to involve lateral components, such as those designated by force arrows 23, as the unavoidable result of such factors as wind loading, apron slope or irregularities, parking stresses, uneven tire inflations or wear, and the like.

Figure 2:
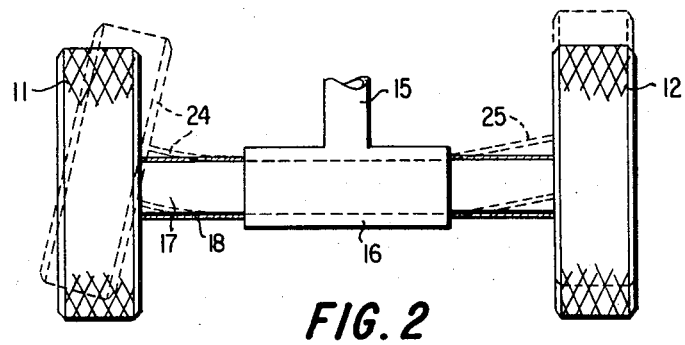
FIG. 2 portrays an aircraft landing gear assembly, together with dashed linework characterizing bending- and shear-deflection effects.
Figure 3:
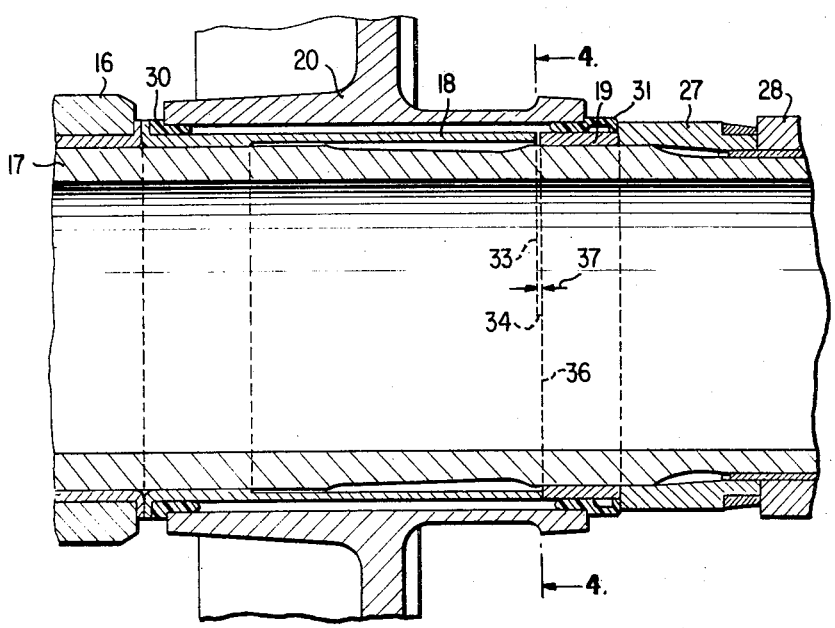
FIG. 3 is a cross-sectional view of a portion of one side of the landing gear assembly illustrated in FIG. 1 and showing details of a composite wear-sleeve assembly therein disposed on the axle between the truck beam and one of the wheels.

Referring to the purposely-exaggerated showings in FIG. 2, it will be noted that, as the result of the aforesaid forces, the deflections of the halves of axle 17 reflect the effects of both bending moments and shear. The bending moments tend to cause deflections characterized by dashed linework 24, wherein the bending moment varies with position along the longitudinal axis of the axle 17, and of course represents the vertical load multiplied by the distance between that position and the center of pressure of the tire on the underlying apron, plus any lateral loads multiplied by the tire radius. Accordingly, when associated strain-gage transducers responsive to bending moments are employed to measure the loading, their axial positions are highly critical, and, moreover, the contributions due to side loadings cannot be isolated and discounted, such that the measurements can be seriously in error if they are taken to represent aircraft weight. By way of important distinction, however, a measurement of shear characterizes only the forces in the vertical direction, as desired; this may be understood through reference to FIG. 2, wherein dashed linework 25 designates the nature of the shear deflections and shows that it is even essentially independent of the positions along each half of the axle.

For the foregoing reasons, aircraft weighing systems tend to be significantly more practical and reliable when designed to rely primarily upon shear-responsive transducers; in a preferred arrangement, these transducers take the form of units which may be disposed within each half of the hollow cylindrical axles to sense and characterize, in a known manner, only those shear effects which take place due to weight-related forces acting in the vertical direction. Heretofore, however, the troublesome error-inducing hysteresis effects introduced into the measurements by the slippage, or displacement, already referred to, which occurs between the transducer-containing axle 17 and a wear sleeve 18 disposed thereon for protecting the same from being damaged by the brake collar 20, has not been satisfactorily accounted for.

In a preferred embodiment of the present invention which overcomes such difficulties, and which appears in FIGS. 3 through 6, the two parts 18 and 19 of a composite wear sleeve are shrink-fitted, or force-fitted, upon one half, or one side, of an axle 17, being axially positioned thereon between a truck beam 16, at one end, and, at the other end, a metallic spacing ring 27 of aluminum or the like and the nearby wheel bearing 28 for an aircraft wheel, such as, for example, wheel 11 or 12. In their radial relationships, the two-part sleeve 18, 19 is concentrically disposed between the axle 17 and the surrounding brake collar 20, with one sleeve part 18 engaging an annular brake collar bushing 30 adjacent the truck beam 16 and the other sleeve part 19 engaging another brake collar bushing 31 adjacent the spacing member 27. As shown, the sleeve part 18 is substantially tubular in configuration, but is provided on one end face thereof with an axially-extending portion 33 of substantially semi-annular or half-ring configuration. Half-ring portion 33 is positioned below the neutral axis of the axle 17, with its diametrically-opposed ends or shoulders 34 both lying in a horizontally-disposed plane containing the neutral axis of the axle. The extension portion 33 may be formed conveniently by cutting away an edge portion of the sleeve 18 through about 180° of the end face thereof, for a relatively short distance. Further, the inner diameter of the sleeve part 18 is intentionally made slightly greater, along a substantial portion of the axial length thereof from the end having the extension 33 thereon, than in the remaining portion adjacent the opposite end. In this same region, it is possible also to reduce the outside diameter of the axle 17 to provide additional clearance between the axle and the sleeve part 18 and thereby further reduce the possibility that, on deflection, the wear sleeve may engage the axle and thereby alter the very deflection characteristics upon which a transducer disposed thereon (not illustrated in FIG. 3) is dependent for accuracy of response. Shrink-fitting of the sleeve part 18 on the axle 17 is of course accomplished at the smaller-diameter end of the sleeve part, opposite the end having the extension 33. The other sleeve part 19 likewise is tubular in configuration and has a substantially uniform-diameter inside surface so that the same may be press-fitted along its full axial length, which may be somewhat less than that of the sleeve part 18, about a portion of axle 17 immediately adjacent to the portion thereof covered by the sleeve part 18. In assembly, therefore, the sleeve part 19 is positioned on the axle 17 in abutting end-to-end relation with the extension 33 of sleeve part 18 appearing below the normally centralized neutral axis of the axle 17. This assembly forms a substantially two-part wear sleeve arrangement, the sleeve parts 18 and 19 serve to protect the axle from brake collar wear and extraneous forces in the highly-sensitive region in which an internal transducer is to be mounted, and are not otherwise load-bearing, except in axial directions.

Figure 4:
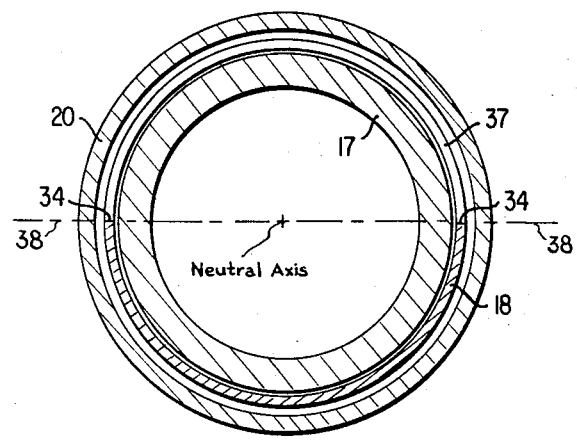
FIG. 4 is a cross-sectional view taken along the line 4—4 of FIG. 3.
Figure 5:
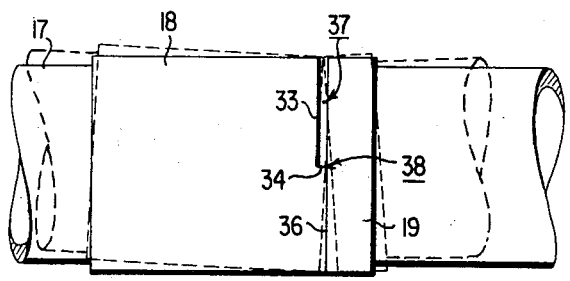
FIG. 5 is a schematic showing the split wear sleeve of this invention under deflection conditions and illustrating the pivotal relative displacement which occurs between the two parts of an improved wear sleeve upon deflection due to loading.

As is characterized in FIG. 5, a load-imposed deflection of the axle 17 causes one or both of the sleeve parts 18 and 19 to be pivoted in the direction of the other about a transverse horizontal axis of line, 38, (FIGS. 4 and 5). On upward deflection of the axle, the two abutting sleeve parts, each separately secured to the axle at axially-displaced positions, will tend to separate below axis 38 and to draw nearer one another above that axis, as enabled by the provision of gap 37. The two sleeve parts do not lose contact with one another at the site of the axis 38, however, where shoulders 34 continue to engage the part 19. Provided these positions of contact are aligned substantially horizontally with the neutral axis of the axle structure, substantially pure pivotal or rocking action occurs between the parts, and they are neither forced further apart nor permitted to draw closer together, axially. This is highly important, because the composite sleeve is to preserve a predetermined axial spacing and because, otherwise, the two sleeve parts would tend to slip axially out of their intended positions with attendant wearing and possible damage to the relatively sensitive axle. In particular, the arrangement where pivotal action might occur above the neutral axis is avoided, because the wear-sleeve parts would tend to be forced apart axially, disturbing the intended axial relation between elements and/or subjecting them to great stress.

It should be understood that the relief provided by gap or slot 37 may be realized in other ways, such as, for example, by cutting back sleeve 19, or both of the sleeve parts, or by forming appropriately-located pivoting protrusions on one or both sleeve parts. Similarly, the sleeve assembly may include more than two parts, with the articulable joining between them.

Figure 6:
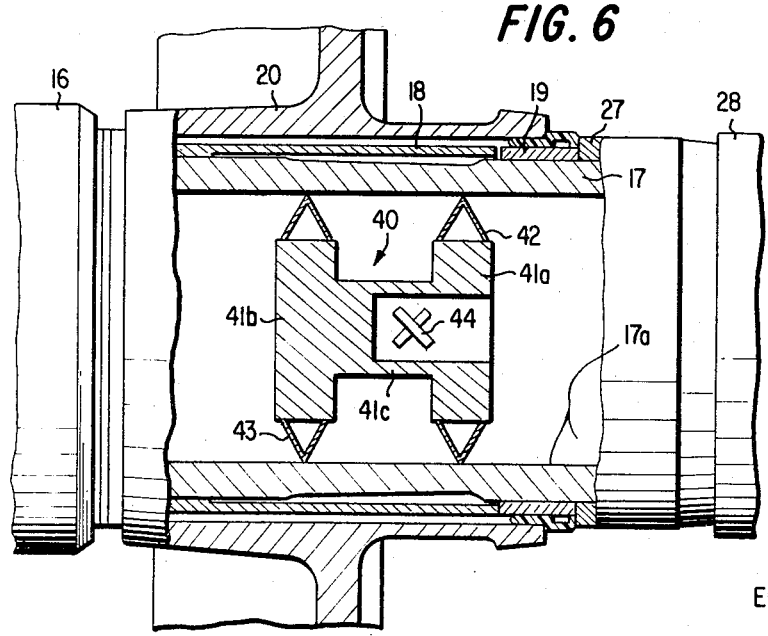
FIG. 6 is an illustration of a landing gear assembly like that of the preceding FIGURES, a wear-sleeve and inside-axle transducer combination being included.

FIG. 6 illustrates a typical installation of a shear-responsive transducer 40 in one side of the hollow cylindrical axle 17 equipped with the improved composite wear sleeve, for sensing and characterizing only the shear effects which take place due to weight-related forces acting in the vertical direction. The sensing element includes spaced rigid end portions 41a and 41b and an intermediate relatively thin-walled flexible tubular portion 41c, the rigid end portions being independently suspended within the axle by separate expansible annular collets 42 and 43, which preferably have firm, substantially line-contact engagements with the inner axle surface 17a around their outer peripheries. Because of their substantially triangular cross-sectional configurations, the inner peripheries of these annular collets each make firm holding engagements with the rigid end portions and tend to hold these end portions in fixed relation to the collets. Known means (not shown) for expanding the collets into locked conditions are also provided. A pair of over-load resistance-type strain gages 44 is bonded to the interior surface of the flexible portion 41c at each of two opposite positions along a horizontal diameter of that flexible portion, where they will respond to tension and compression effects exhibited at these positions; when the gages are connected into a suitable bridge network in a conventional manner, adverse effects on the bridge output due to horizontal and vertical bending forces are cancelled, whereby the bridge output may yield an electrical signal accurately characterizing the vertical force related to weight. The collets 42 and 43 are preferably disposed within the axle 17 in a region intermediate the ends of the sleeve parts 18 and 19, as shown in FIG. 6, where there will be a high sensitivity and where stress effects induced by the force-fitted sleeve parts on the axle will be avoided.

It will be understood by those skilled in the art that transducers of types other than that specifically disclosed and shown herein may be employed within the axle in the area protected by a wear sleeve formed according to the teachings of the present invention. Other modifications and variations, substitutions and combinations may be effected without departure in spirit and scope from this invention in its broader aspects and as set forth in the appended claims.

What I claim as new and desire to secure by Letters Patent of the United States is:

1. A sleeve arrangement for protecting an aircraft landing gear axle assembly from damage and from deflection-characteristic instability along an axle length where strain gage means responds to axle deflections to measure weight supported by the axle, comprising at least a pair of substantially tubular sleeve parts disposed about said axle in substantially end-to-end abutting relation with one another, said parts being substantially fixed in relation to said axle at axially-spaced positions therealong, at least one of said sleeve parts including pivot means at one end thereof in engagement with the other of said parts to produce said abutting relation therebetween at positions on opposite sides of said axle which are not above the neutral axis of the axle assembly, the ends of said sleeve parts being axially spaced apart above said positions, whereby upon upward deflection of said axle assembly due to loading said sleeve parts pivot relative to one another about said pivot means.

2. A sleeve arrangement as set forth in claim 1 wherein at least one of said parts is substantially fixed in relation to said axle at a position axially spaced from the other of said parts and is of larger diameter than and radially spaced from said axle at other positions.

3. A sleeve arrangement as set forth in claim 2 wherein said sleeve parts are shrink-fitted into said substantially fixed relation to said axle, and wherein said axially-spaced positions at which said parts are fixed in relation to said axle span the axle length where the strain gage means responds to the axle deflections.

4. A sleeve arrangement as set forth in claim 1 wherein said pivot means are in said abutting relation in substantially the same horizontal plane, and wherein said pivot means are formed integrally with an end of said one of said sleeve parts.

5. A sleeve arrangement as set forth in claim 4 wherein said pivot means extend axially from said end of one of said sleeve parts into said abutting relation with the other of said sleeve parts, and wherein said neutral axis lies substantially in said horizontal plane.

6. A brake sleeve arrangement for protecting a hollow aircraft landing gear axle from brake collar wear and from deflection-characteristic instability along an axle length where an inside-axle strain gage transducer is mounted to respond to axle deflections to measure weight supported by the axle, comprising a pair of tubular wear sleeve parts surrounding said axle in substantially end-to-end abutting relation with one another, said parts being tightly fitted in relation to said axle at axially spaced-apart positions spanning said length of said axle and between inside surfaces of said brake collar and outside surfaces of said axle, at least one of the abutting ends of one of said sleeve parts being in the form of a semi-annular extension of said one of said sleeve parts disposed below the neutral axis of said axle, whereby a semi-annular gap normally exists between the abutting ends of said sleeve parts and, upon upward deflection of said axle due to loading, said sleeve parts are free to pivot relative to one another.

7. A brake sleeve arrangement as set forth in claim 6 wherein said tubular wear sleeve parts are substantially of right cylindrical form, and wherein said semi-annular extension is formed by providing said semi-annular gap at said one of the abutting ends of said one of said sleeve parts.

8. A brake sleeve arrangement as set forth in claim 7 wherein at least one of said sleeve parts is of larger inside diameter than and normally radially spaced from the outside of said axle at positions axially displaced from that at which it is tightly fitted in relation to said axle.

9. A brake sleeve arrangement as set forth in claim 8 wherein one of said sleeve parts is axially longer than the other, wherein the arcuate ends of said semi-annular extension are disposed in substantially the same horizontal plane, and wherein said neutral axis lies substantially in said horizontal plane.

10. In an aircraft landing gear assembly having an axle supported within a truck beam and secured at one end to a wheel, and a brake collar disposed about said axle between said truck beam and said wheel, the improvement comprising a first tubular wear sleeve part tightly fitted on said axle between said brake collar and said axle, a second substantially tubular wear sleeve part tightly fitted on said axle between said brake collar and said axle, said second tubular sleeve part having a semi-annular extension on one end thereof providing a semi-annular end face in abutting relation to the end face of said first tubular sleeve part, said extension curving below the neutral axis of said axle and thereby leaving a relatively narrow gap between said first and second tubular sleeve parts above said neutral axis, the arcuate end portions of said semi-annular extension serving as fulcrums for pivotal movement of said sleeve parts relative to one another about a substantially horizontal line transverse to the neutral axis of said axle.

11. In an aircraft landing gear assembly as set forth in claim 10, the improvement wherein said second tubular sleeve part is longer than said first sleeve part and has an inside diameter at one end thereof which is substantially the same as the outside diameter of said axle for being tightly engaged therewith, and which at the other end thereof having said extension thereon is of a greater diameter affording a radial spacing from said axle.

* * * * *